Dec. 11, 1923.
D. W. GRIFFITH
1,476,885
METHOD AND MEANS FOR TAKING MOVING PICTURES
Filed Nov. 17, 1921
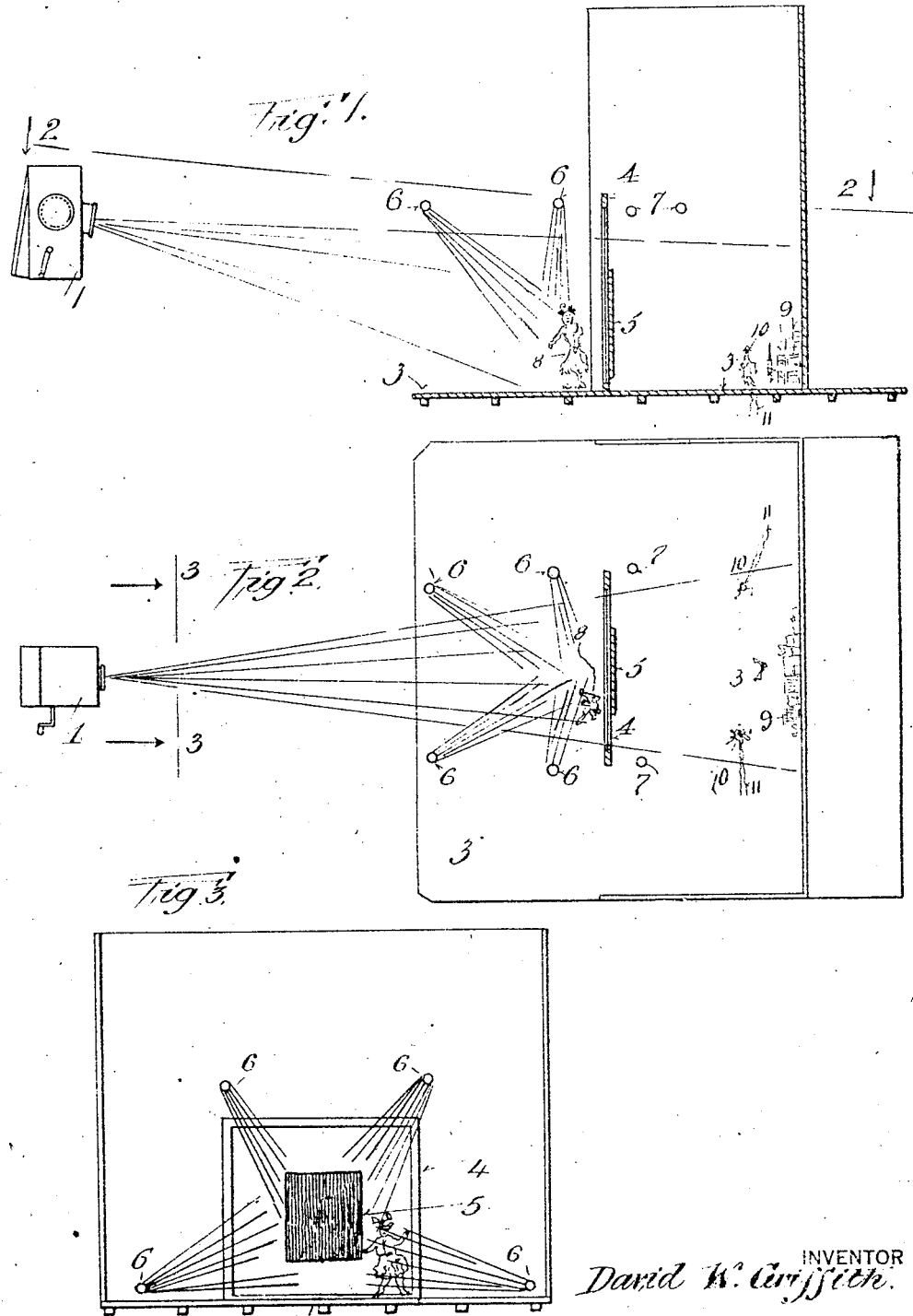
INVENTOR
David W. Griffith.
BY HIS ATTORNEY
O. Ellery Edwards Patented Dec. 11, 1923.

1,476,885

UNITED STATES PATENT OFFICE.

DAVID WARK GRIFFITH, OF MAMARONECK, NEW YORK.

METHOD AND MEANS FOR TAKING MOVING PICTURES.

Application filed November 17, 1921. Serial No. 515,875.

*To all whom it may concern:*

Be it known that I, DAVID WARK GRIFFITH, a citizen of the United States, and a resident of Mamaroneck, county of Westchester, and State of New York, have invented a new and useful Improvement in Methods and Means for Taking Moving Pictures, of which the following is a specification.

The object of my invention is to provide a method and means by virtue of which it will be possible to reduce the cost of scenery when producing photo-plays by placing natural sized objects and actors in the foreground and small models and dummies in the background and then operating the camera and the light effects and a curtain so that ultimately a negative will be formed in which the foreground and background will be properly blended. This and other objects are accomplished by my invention, one embodiment of which is hereinafter more particularly set forth.

For a more detailed description of my invention, reference is to be had to the accompanying drawings, forming a part hereof, in which Figure 1 is a longitudinal section of my invention.

Figure 2 is a sectional view, taken on the line 2—2 of Figure 1, looking in the direction of the arrows, and Figure 3 is a view, taken on the line 3—3 of Figure 2, looking in the direction of the arrows.

Throughout the various views of the drawings, similar reference characters designate similar parts.

Where my invention is employed, a camera 1 of the usual type for moving pictures is used which has an indicating device 2 by means of which it is possible to restore the film so that a double exposure may be had and the registration will be perfect. Throughout the operations hereinafter described, the position of the camera 1 remains unchanged.

The stage 3 has a dividing partition 4 with a window opening therein which may be closed by a black curtain 5 so as to be blank or which may be opened so that a view can be had from the camera to the rear of the partition. The part of the stage 3 in front of the partition 4 is called the foreground and the part of the stage in rear of the partition 4 is called the background; the camera being considered as being placed in front of the stage.

The foreground may be illuminated in the conventional manner, as by suitable lights 6 and the background is also illuminated in a similar manner by suitable lights 7. The lights 6 shine on actors 8 and the lights 7 shine on models 9 and dummies 10 which are in the background. The dummies 10 may be moved by any suitable means as by strings 11 so as to give a realistic effect. The actors 8 act at one side of the window and not in front of it.

Assuming that the moving pictures to be produced should show actors before the window with a background beyond the window composed of a city, a forest and clouds, etc., and perhaps some moving dummies a boat on a lake or what not, the procedure is as follows:

The curtain 5 over the window is first lowered, the lights 7 are extinguished and the lights 6 are illuminated, and then the actors perform their parts before the camera which is operated in the usual way. When their act is complete, the lights 6 are extinguished, the camera 2 is reversed until the film is at its initial starting point, as shown by the indicator 2, the curtain is removed from the window, the lights 7 are illuminated and then the film is again run through the camera and this time photographs what is in the background through the window. When the negative is developed it will be composite and the foreground and background will properly blend and positives may be taken from this negative in the usual way and from these positives the moving pictures can be displayed in which the foreground and background properly blend. By the use of this invention, it is possible to have a picture representing ancient Babylon at a small expense. If the foreground and background were on the same scale, the expense would be prohibitive. By the use of this invention, it is possible to produce the picture with all the reality and vividness that it would have if taken in the usual way with full sized surroundings and background.

While I have shown and described one embodiment of my invention, it is obvious that it is not restricted thereto, but that it is broad enough to cover all structures that come within the scope of the annexed claims.

Having thus described my invention, what I claim is:

1. Means for taking a composite film which consists in a camera, a stage, a partition dividing the stage into a foreground and a background, a window and means for covering the same, foreground lights and background lights with life sized actors and objects in the foreground and small models and dummies in the background so that the foreground and background may be photographed at different times, the background being photographed through the window and a composite negative made in the camera.

2. Means for taking a composite film which consists of a camera, a stage, a partition with an opening therein which may be covered by a black curtain dividing the stage into a foreground and a background, foreground lights and background lights with life sized actors and objects in the foreground, small models and dummies in the background and means for moving said dummies when desired so that the foreground and background may be photographed at different times, the background being photographed through the opening when the curtain is removed and a composite negative made in the camera.

In testimony whereof, I have hereunto set my hand this 28th day of October, 1921.

DAVID WARK GRIFFITH.